United States Patent Office 3,772,361
Patented Nov. 13, 1973

3,772,361
PROCESSES FOR PREPARING 25-HYDROXYCHOLECALCIFEROL
Hector Floyd Deluca, Madison, Wis., and John Wilson Blunt, Christchurch, New Zealand, assignors to Wisconsin Alumni Research Foundation, Madison, Wis.
No Drawing. Filed Dec. 9, 1968, Ser. No. 789,638
Int. Cl. C07c 169/60, 171/08
U.S. Cl. 260—397.2                2 Claims

ABSTRACT OF THE DISCLOSURE

Method for preparing 25-hydroxycholecalciferol from chloest-5,7-dien-3β,25-diol; methods for preparing cholest-5,7-dien-3β,25-diol and the new compound cholest-5,7-dien-3β,25-diol.

This invention relates to processes for preparing 25-hydroxycholecalciferol, a compound characterized by vitamin-D-like activity, through a heretofore unknown intermediate compound. 25-hydroxycholecalciferol (25-HCC) is the subject of United States Letters Patent No. 3,565,924, issued Feb. 23, 1971.

Prior to the present invention, and as disclosed in the aforementioned application for United States Letters Patent, the only method for preparing 25-HCC was by isolation from the blood plasma of hogs which had been maintained on high daily levels of vitamin $D_3$ for extended periods. It has now been found that 25-HCC can be prepared by snythetic means, and specifically by ultraviolet irradiation of a heretofore unknown intermediate compound, cholest-5,7-dien-3β,25-diol.

PREPARATION OF THE INTERMEDIATE

The following descriptions of the processes of this invention are exemplary only and starting materials and reactants other than those specifically set forth in the indicated Procedures A and B can be utilized as will be evident hereinafter.

Procedure A 100 mg. of 3,25-cholesteryl diacetate was dissolved in a mixture of 1.5 ml. dry benzene and 1.5 ml. dry Skelly B (Skellysolve B, straight run naphthas (essentially normal hexane) derived from petroleum oil, having a boiling range of from about 60°–68° C.; marketed by Skelly Oil Company). The resulting solution was added to 32 mg. of finely powdered N,N¹-dibromodimethylhydantoin in a test tube which was then immersed in a water bath maintained at a temperature in the range from about 72°–74° C. When dissolution of the N,N¹-dibromodimethylhydantoin was complete the solution was cooled in ice and the crystalline precipitate of dimethylhydantoin was filtered off with two one-ml. rinses with cold Skelly B which were included in the filtrate. The filtrate was evaporated to dryness at less than 40° C. under vacuum and the resulting residue was taken up in 0.4 ml. of dry xylene. This solution was added dropwise along with two 0.1 ml. rinses, to a solution of 0.1 ml. trimethylphosphite in 0.3 ml. of xylene maintained at about 130°–135° C. The resulting mixture was allowed to react for about 90 minutes while it was held in the indicated temperature range and then it was evaporated to dryness at about 65° C. under vacuum.

The residue obtained was dissolved in Skelly B and applied to a chromatographic column of 25 gms. of neutral alumina, grade I (Bio-Rad, from California Corp. for Biochemical Research, Los Angeles, Calif.). The columns was eluted with a 1:3 mixture of diethyl ether and Skelly B followed by a 1:1 mixture of the same solvents and 12 ml. fractions were collected. The fractions containing the diacetate of cholest-5,7-dien-3β,25-diol as determined by UV spectrum of the fractions with maxima at 272, 282, and 294, mμ were combined and evaporated to dryness to recover the diacetate compound.

The recovered diacetate compound was dissolved in 3 ml. of dry ethyl ether and reacted with a small amount (10 mg. of lithium aluminum hydride ($LiAlH_4$) for about five minutes. The reaction solution is washed with several aliquots of water to remove the inorganic materials, the ether layer is separated, dried and the ether removed by evaporation under vacuum. The resulting residue in the amount of 18 mg. was identified as cholest-5,7-dien-3β,25-diol from the following data:

M.P.: 169°–171° C. (aqueous MeOH)
λ max.: 272, 282 and 294 ($\epsilon_{282}$ 11,000)
NMR:
  $C_{18}$—$H_3$, δ 0.65 p.p.m.
  $C_{19}$—$H_3$, δ 0.98 p.p.m.
  $C_{21}$—$H_3$, δ 0.89 p.p.m. (doublet, J=6.5 c./s.)
  $C_{26,27}$—$H_3$, δ 1.20 p.p.m.
  $C_{6,7}$—H, δ 5.4 p.p.m. (multiplet)

In the foregoing procedure the starting material may be characterized by ester groups other than the acetate at the 3- and 25-positions. Moreover, the ester groups at these positions need not be the same in each instance as will be evident from the equation below. For example, 25-benzoyloxychloesteryl acetate may be treated in the same manner as is the 3,25-cholesteryl diacetate in the above procedure with comparable results. In general, the substituent at the 3-position of the steroid nucleus of the starting material can be a group having the Formula

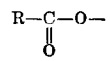

where R represents an alkyl group containing from 1 to 16 carbon atoms or phenyl and the substituent at the 25-position can be a group of the formula

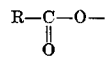

where R is an alkyl group containing from 1 to 6 carbon atoms or phenyl.

Procedure A

R=alkyl containing from 1 to 16 carbon atoms or phenyl
R'=alkyl containing from 1 to 6 carbon atoms or phenyl

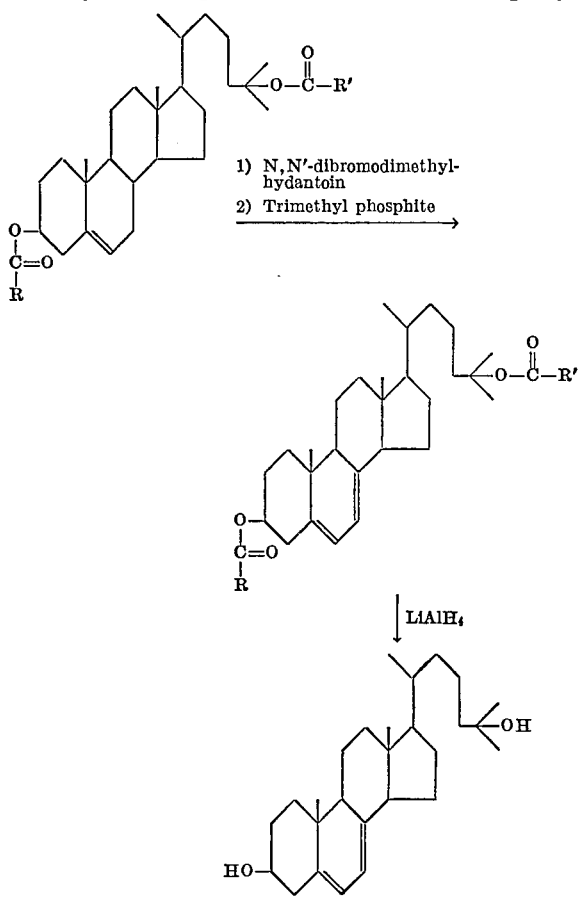

It will be appreciated that the conversion of the diester to the diol in the above procedure can be accomplished by other means than through the reaction with lithium aluminum hydride. For example, alcoholic potassium or sodium hydroxide can be used in place of the lithium compound with equivalent results.

Procedure B 142 mg. of 26-norcholest-5-en-25-on-3β-yl acetate was dissolved in a mixture of 2.2 ml. of dry benzene and 2.2 ml. of dry Skelly B and added to 50 mg. of N,N'-dibromo-dimethylhydantoin. The reaction was carried out in accordance with the method of Procedure A above. The residue obtained from the said procedure was taken up in 0.5 ml. of xylene. This solution was added dropwise, along with a 0.3 ml. rinse of xylene to 0.15 ml. of trimethyl phosphite in 0.5 ml. of xylene maintained at about 130°–135° C. The mixture was allowed to react for about 90 minutes while being held in the indicated temperature range after which the solvent was evaporated under vacuum at a temperature of about 65° C.

The resulting residue was dissolved in chloroform and was absorbed on a chromatographic column containing 20 g. of neutral alumina, grade I. The column was eluted with chloroform and successive 5.5 ml. fractions were collected. 26-norcholest-5,7-diene-25-on-3β-yl acetate was recovered from fractions 10–14 by evaporation of the solvent. The diene compound in the product was identified by the following ultraviolet, infrared and NMR spectra:

UV: ($\epsilon_{282}$ 11,000) max. 272, 282, 294 mµ
IR: λ max. 1730, 1712 cm.$^{-1}$-corresponding to carbonyl absorption of the acetate and methyl ketone groups respectively NMR:
- $C_{18}$—$H_3$—δ 0.63 p.p.m.
- $C_{19}$—$H_3$—δ 0.95 p.p.m.
- $C_{27}$—$H_3$—δ 2.12 p.p.m.
- OAc—δ 2.02 p.p.m.

Gas-liquid chromatography indicated the presence of the starting material 26-norcholest-5-en-25-on-3β-yl acetate) as the only contaminant.

245 mg. of the above residue containing about 180 mg. of the 5,7-diene compound was dissolved in 3.5 ml. of dry benzene and added to the Grignard reagent prepared by the addition of 0.24 mg. methyl iodide in 2.5 ml. dry ether to 72 mg. of magnesium turnings. The combination was refluxed for 2½ hours, allowed to stand for 17 hours and was then added to cold ammonium chloride solution, whereupon an aqueous layer and a solvent (ether) layer separate. The ether layer was removed, dried and the ether evaporated. The residue was triturated with Skelly B, giving, by filtration, 212 mg. of an amorphous powder which through ultraviolet spectrophotometry and gas-liquid chromatography was determined to consist of 140 mg. of cholest-5,7-dien-3β,25-diol with the remainder being 25-hydroxycholesterol.

Procedure B

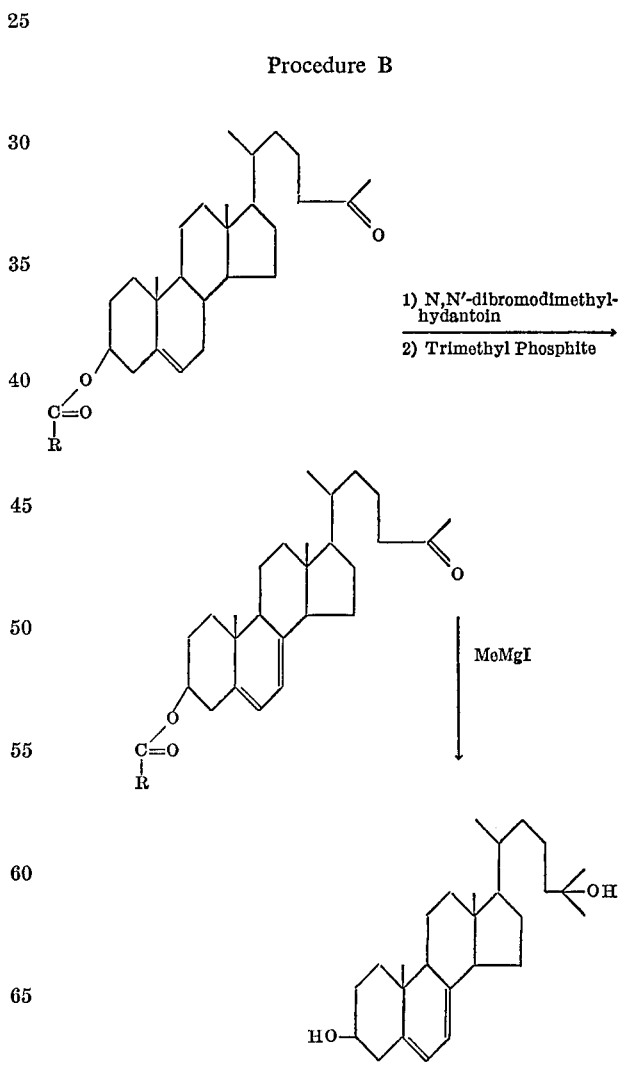

R=alkyl group containing from 1 to 16 carbon atoms or phenyl

It is to be understood that the foregoing procedures are not limited to the specific values and vehicle recited and that variations in temperature and amounts of reactants as well as in the amounts and kind of solvents can be utilized as will be readily apparent to those skilled in the art. Also, other methods may be used to separate the various desired components.

CONVERSION OF THE INTERMEDIATE 106 mg. of the mixture prepared in accordance with Procedure B above and containing 70 mg. of the 5,7-diene compound was dissolved in 400 ml. of ether and was exposed to the radiation from a Hanovia high-pressure quartz mercury vapor lamp (Model 654A) for 3.5 minutes. The irradiation was carried out in a jacket around a double-walled, water-cooled, quartz immersion well and during irradiation the ether solution was stirred vigorously and continuously flushed with nitrogen.

The irradiated products were applied in a 1:1 ether/ Skelly B solution to a multi-bore chromatographic column (Fischer, G. A., and Kabara, J. J. (1966), Anal. Biochem., 9, 303) packed with 14 g. of heat activated silicic acid (Bio-Rad silicic acid, HA, −325 mesh, California Corp. for Biochemical Research, Los Angeles, Calif.) The column was eluted with an ether/Skelly B gradient obtained by running ether into a 250 ml. mixing chamber initially filled with a 1:1 ether: Skelly B solution. Consecutive 2.8 ml. fractions were collected.

It was determined through UV spectrophotometry and gas-liquid chromatography that only fractions 33–38 contained 25-hydroxyprecholecalciferol (identified from UV $\lambda$ max.=261 m$\mu$, $\epsilon_{261}$—9000). These fractions were combined and allowed to stand under a nitrogen atmosphere for about 7 days at room temperature by which time the material was in the form of 25-hydroxycholecalciferol as determined from the following data:

UV: $\lambda$ max. 265 m$\mu$ ($\epsilon$ 18,000)
NMR:
$C_{21}$—$H_3$ $\delta$ 0.90 p.p.m. (doublet, J=8 c./s.)
$C_{18}$—$H_3$, $\delta$ 0.54 p.p.m.
$C_{26,27}$—$H_3$, $\delta$ 1.22 p.p.m.
$C_{19}$—$H_2$, $\delta$ 4.80 p.p.m.; 5.00 p.p.m.
$C_{6,7}$—H, $\delta$ 5.97 p.p.m. (doublet, J=12 c./s.); 6.25 p.p.m. (doublet, J=12 c./s.)
MW: 400.3340 (calc. $C_{27}H_{44}O_2$, 400.3341)

Fractions collected later than fraction No. 38 contained 25-hydroxytachysterol$_3$, 25-hydroxycholesterol and a small amount of unconverted 5,7-diene. Those fractions containing 25-hydroxytachysterol$_3$ and unchanged 5,7-diene were combined with similar fractions from the irradiation of a second batch of material as described above, and were re-irradiated, also as described, for an additional 3½ minutes. Chromatography of the products in an activated silicic acid column gave an additional yield (8 mg.) of 25-hydroxycholecalciferol.

Irradiation of 15 mg. of the 5,7-diene prepared by Procedure A above for 2½ minutes in accordance with the procedure outlined above yielded 2.4 mg. of 25-hydroxyprecholecalciferol which was converted to 25-hydroxycholecalciferol as described hereinbefore.

The conversion of the 5-7-diene to 25-hydroxyprecholecalciferol and 25'-hydroxycholecalciferol is illustrated by the following equation:

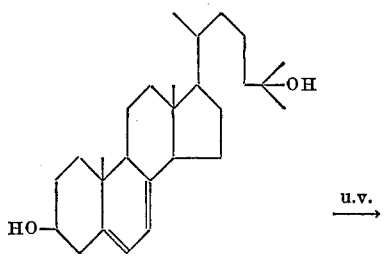

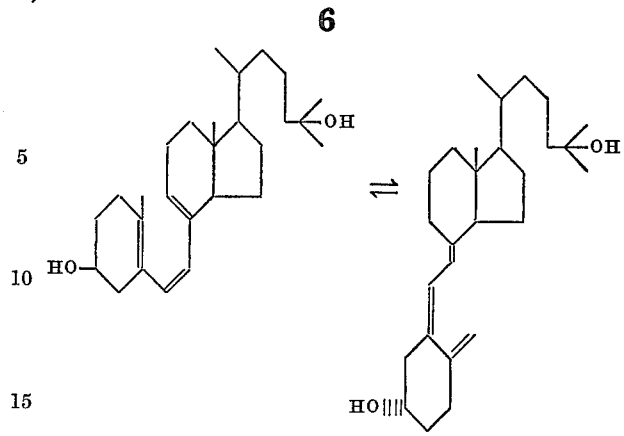

BIOLOGICAL ACTIVITY OF SYNTHETIC 25-HYDROXYCHOLECALCIFEROL

Line test assay or rickets cure test

Weanling rats were fed the rachitogenic diet of Steenbock and Black, J. Biol. Chem., 64, 263 (1925), for 21 days. The diet was modified by the addition of water soluble vitamins as described in De Luca et al., J. Nutri., 75, 175 (1961). After the 21 day depletion period a single 4 IU dose of either standard vitamin $D_3$ or the synthetically produced 25-hydroxycholecalciferol was administered. Seven days later the rats were killed and the line test was performed on sectioned radii and ulnae of individual rats. The biological activity was ascertained as described in U.S. Pharmacopeia, 14th revision. (Mack Publishing Co., Easton, Pa. (1955)).

Routinely, the synthetic product gave a value of 55–60 IU per $\mu$g. whereas vitamin $D_3$ gave values of only 40 IU per $\mu$g.

Calcium transport by everted intestinal sacs

Male weanling rats were maintained in hanging wire cages and fed ad libitum a purified vitamin D deficient diet as described in De Luca et al., J. Nutr., 75, supra. This diet does not induce rickets in rats but produces a severe vitamin D deficiency in 3–4 weeks characterized by low serum $Ca^{++}$ and reduced growth (Steenbock, H. and Herting, D. C., J. Nutr., 57, 449 (1955)).

Assays were performed in accordance with the procedures outlined in Blunt, J. W., Tanaka, Yoko, and De Luca, H. F. (1968), Proc. Nat. Acad. Sci., in press. 0.25 $\mu$g. of vitamin $D_3$ and the synthetic 25-hydroxycholecalciferol (25 HCC) respectively were administered intrajugularly in 0.02 cc. of ethanol. Results are shown in the following table where calcium transport is expressed as a ratio of $45_{Ca}$ (serosal side)/$45_{Ca}$ (mucosal side).

TABLE I

| Sample | Hours after administration | Number of animals | Transport ratio |
|---|---|---|---|
| Control (ethanol only) | | 4 | [1] 1.59±0.17 |
| 25-HCC | 4 | 5 | 2.31±0.50 |
| Vitamin $D_3$ | 4 | 4 | 1.01±0.12 |
| 25-HCC | 6 | 4 | 2.33±0.31 |
| Vitamin $D_3$ | 6 | 4 | 1.32±0.10 |

[1] Standard deviation.

It is evident from the foregoing data that the synthetic 25-HCC initiates the onset of calcium transport in the intestine more rapidly than does vitamin $D_3$.

Serum calcium response (bone mobilization)

Male weanling rats were fed the vitamin D-deficient diet described in De Luca et al., J. Nutr., 75, supra, for 11–15 days except that the calcium was eliminated from the diet. The rats were then dosed intrajugularly with 2.5 $\mu$g. of synthetic 25-HCC or vitamin $D_3$ each in 0.02 cc. of ethanol. Serum was collected from the animals at the times indicated in the table below and assayed for calcium by the method of Webster, Am. J. Clin. Pathol., 131, 330 (1960). All assays were conducted in duplicate with the results indicated in the following table.

TABLE II

| Hours after administration | Serum Ca mg./100 ml. | | |
|---|---|---|---|
| | Vitamin $D_3$ | 25-HCC porcine isolate [1] | 25-HCC synthetic |
| 0 (control) | | 3.75±0.23 | |
| 8 | [2] 3.9±0.1 (3) | 5.7±0.2 (4) | 6.4±0.50 (7) |
| 12 | 5.0±0.4 (3) | 7.1±0.4 (4) | 7.36±0.21 (6) |

[1] Method of isolation in U.S. App. S.N. 741,236 supra.
[2] Number in parentheses indicates number of rats in group.

It is evident from the above data that the synthetic 25-HCC is able to stimulate bone resorption as indicated by the increase in serum calcium concentration much more quickly than vitamin $D_3$ and at least as quickly as 25-HCC isolated from porcine plasma.

It is abundantly clear from the foregoing that 25-hydroxycholecalciferol produced in accordance with the methods of this invention is identical in structure to the compound disclosed and claimed in the forementioned United States Letters Patent No. 3,565,924 and that it functions in substantially the same manner. Consequently, its application as a substitute for vitamin D would be obvious.

What is claimed is:
1. Cholest-5,7-dien-3β,25-diol.

2. A compound having the formula

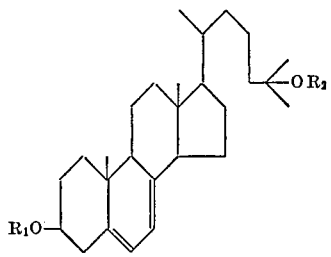

where $R_1$ and $R_2$ are selected from the group consisting of H and an acyl radical of hydrocarbon carboxylic acid having less than 12 carbon atoms.

References Cited

UNITED STATES PATENTS

| 2,546,788 | 3/1951 | Schaaf et al. | 260—397.2 |
| 2,864,829 | 12/1958 | Klein et al. | 260—397.2 |
| 2,981,742 | 4/1961 | Chemerda et al. | 260—397.1 |

OTHER REFERENCES

Chemical Abstracts, vol. 49, column 7585(a) (1955).
Chemical Abstracts, vol. 51, column 2909(b) (1957).
Fieser and Fieser, "Steroids," pp. 153–163 (1959).
Morrison and Boyd, "Organic Chemistry," pp. 314–318, 491–492 (1962).

ELBERT L. ROBERTS, Primary Examiner